United States Patent Office 3,483,930
Patented Dec. 16, 1969

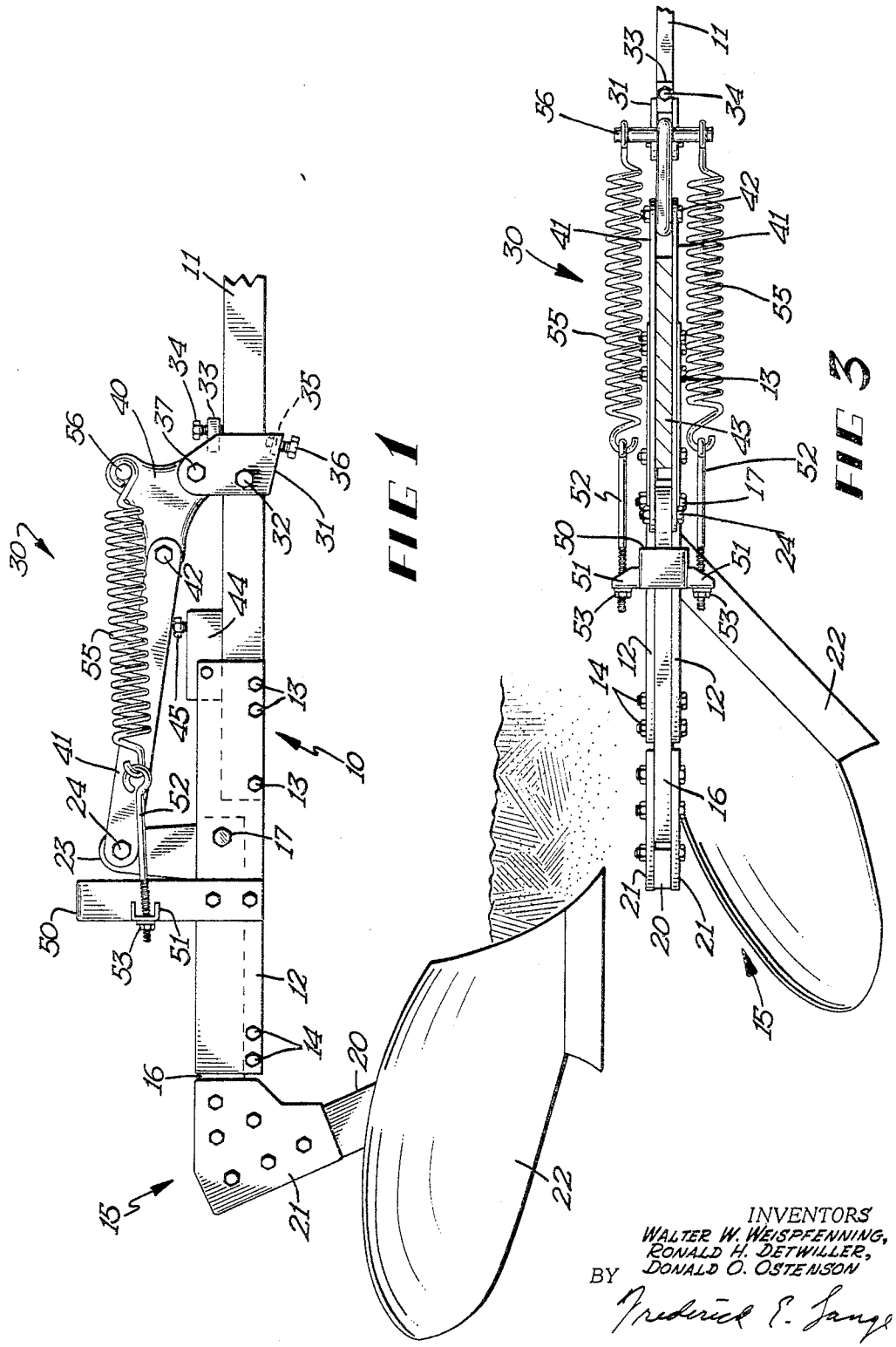

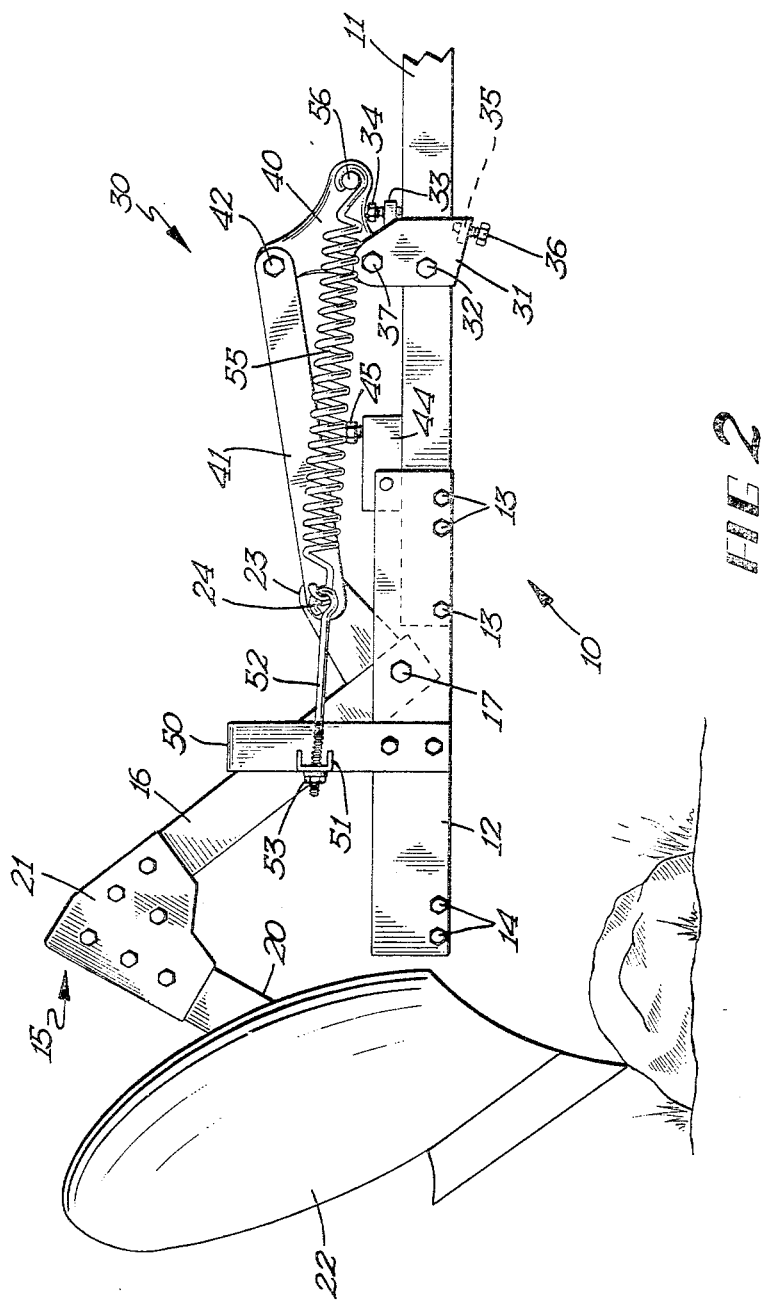

3,483,930
TRIPPING MECHANISM FOR AGRICULTURAL IMPLEMENTS
Ronald H. Detwiller, Donald O. Ostenson, and Walter W. Weispfenning, Cooperstown, N. Dak., assignors, by mesne assignments, to Clark Equipment Company, Buchanan, Mich., a corporation of Delaware
Filed Apr. 14, 1967, Ser. No. 630,858
Int. Cl. A01b 61/00, 35/20
U.S. Cl. 172—267                          9 Claims

ABSTRACT OF THE DISCLOSURE

This invention relates to agricultural implements having a trip beam which is pivotally connected to a supporting beam to permit rotation of the trip beam, and a ground working tool such as a plowshare connected thereto, from an operative position to a raised position when an obstruction is encountered. Springs are connected between the supporting beam and a toggle linkage connected to the trip beam to exert a force in opposition to rotation from the operative position to the raised position. The operation of the linkage and springs is such that this force is at a maximum when the trip beam is in the operative position. When an obstruction is encountered and a force is exerted sufficient to initiate rotation, the force in opposition to this rotation decreases substantially as the trip beam is rotated to the raised position. After the ground working tool has passed over the obstruction, the spring force returns it to the operative position, and this force increases substantially as the operative position is approached. In the present invention the moving parts of the tripping mechanism are all disposed above the supporting beam, where they are relatively free from dirt and debris.

BACKGROUND OF THE INVENTION

This invention relates to agricultural implements which release or trip when the ground working tool encounters an obstruction. More particularly, the invention relates to yieldable implements of the type in which the ground working tool is automatically reset to the operative position after it has passed over the obstruction. Many of the previous releasable implements have provided a latch mechanism which releases the ground working tool and permits it to rotate upwardly when it strikes an obstruction, but where these latch mechanisms are employed it is necessary for the operator to reset the ground working tool either manually or by backing up the entire implement.

Devices for automatically resetting the ground working tool after it has passed over an obstruction have also been provided, but these have not been entirely satisfactory. Where springs are used to directly oppose rotation of the tool to the raised position and to return it to the operative position, certan difficulties arise. As the ground working tool begins to rotate from the operative position to the raised position, the tension on a spring directly opposing such movement is constantly increased. When a large obstruction is encountered, this tension may increase to the point where parts of the implement are damaged, or where the mechanism becomes so unyielding that the entire implement is raised off the ground.

Previous releasable implements have embodied another significant disadvantage, such implements have provided release mechanisms, including linkages and springs, which are in a position in which dirt and field debris readily comes in contact with the moving parts, thereby causing interference with the proper operation of the mechanism and undue wear.

SUMMARY OF THE INVENTION

In the present invention the force biasing the trip beam to the operative position rapidly decreases as the trip beam rotates to the raised position, thereby enabling the ground working tool to easily pass over even a relatively large obstruction. After the tool has passed over the obstruction, and the trip beam begins to rotate back to the operative position, the returning force rapidly increases to effectively drive the implement back into the soil.

The force exerted by the springs and tending to hold the trip beam and ground working tool in the operative position is transmitted through a linkage which serves to exert a relatively large force on the trip beam when it is in the operative position. The force exerted in this position is sufficiently large to permit operation of the plow in relatively hard soil without tripping the mechanism except under an overload of sufficient magnitude, such as that caused by engaging an immovable obstruction.

The present invention provides a main supporting beam which is substantially horizontal and which supports the rotatable trip beam and the tripping mechanism. In the present invention all moving parts of the tripping mechanism are located above the lower limits of the main supporting beam, where they are relatively protected from the soil, and from field debris. The parts are also protected from the contact with an obstruction, both in the normal position, and in the tripped position. The trip beam consists of a downwardly extending portion to which the plowshare is secured and a substantially horizontal portion which is pivotally connected at a point near its forward end to the supporting beam. This horizontal portion of the trip beam is disposed above the lower edge of the supporting beam, and since the trip beam is pivotally connected near its forward end, the forward end is not rotated to a position below the main beam where there would be danger of engagement with the obstruction. Thus, all moving parts except the downwardly extending portion of the trip beam are dispersed, and operate, above the lower edge of the main supporting beam where they are relatively protected from clogging and undue wear caused by soil and other material.

The present invention provides means for adjusting the tension on the springs in accordance with the hardness of the soil in which the implement is being used. Further adjustment of the force exerted upon the trip beam and ground working tool is provided by an adjustable bracket which is pivotally connected between the tripping linkage and the supporting beam to permit adjustment of the angle between the links. As this angle approaches 180 degrees, the moment arm through which the force of the obstacle is exerted in opposition to the spring force decreases to a point where a relatively large force is necessary to rotate the trip beam from the operative position. Stop means carried by the supporting beam prevent the angle between the links from ever reaching 180 degrees, at which point the links would be locked. The adjustable bracket connected between the linkage and the supporting beam provides adjustment of the sensitivity without at the same time altering the position of the trip beam, which is always maintained in the same operative position with respect to the soil.

A primary object of the invention is to provide a release or tripping mechanism for agricultural implements in which the force exerted in opposition to rotation of the trip beam and ground working tool from the operative position to the raised position rapidly diminishes as the raised position is approached. Another object of the invention is to provide a release mechanism the moving parts of which are located in a position where they are free from contact with dirt and debris, to thereby prevent interference with the operation of the parts and to reduce wear.

DESCRIPTION OF DRAWINGS

FIGURE 1 is a view in side elevation of a portion of a plow embodying the present invention with parts shown in the normal or operative position;

FIGURE 2 is a view in side elevation of the plow shown in FIGURE 1 with parts shown in the tripped or raised position; and FIGURE 3 is a top view of the plow shown in FIGURE 1.

DESCRIPTION OF THE PREFERRED EMBODIMENT

Referring to FIGURE 1, a drawbar or supporting beam, referred to in its entirety by general reference numeral 10, is adapted for connection to a source of motive power, not shown. A substantially horizontally disposed single bar 11, which is adapted for connection to the source of power, comprises a forward portion of the supporting beam 10. A pair of parallel plates 12 are secured, such as by bolts 13, to opposite vertical sides of a rear portion of bar 11, and extend rearwardly therefrom in parallel-spaced relationship, comprising the rear portion of supporting beam 10. The parallel plates 12 are secured to bar 11 in such a manner that the lower edges of the plates are contiguous with the lower edge of bar 11, plates 12 also being substantially horizontally disposed. Plates 12 are of a width somewhat greater than bar 11, and since the lower edges of plates 12 are substantially even with the lower edge of bar 11, the upper edges of plates 12 extend above the upper edge of bar 11.

A trip beam, designated in its entirety by general reference numeral 15, embodies a normally horizontally disposed bar 16, which is pivotally connected between supporting beam plates 12 by a pin 17. Pivot pin 17 extends through plates 12 and trip beam bar 16 at a point to the rear of bar 11, and extends through trip beam bar 16 at a point near the forward end thereof, with this forward end being spaced rearwardly from bar 11. Trip beam bar 16 is of a width less than the width of plates 12, and the upper edge of bar 16 in its normal position is substantially even with the upper edges of plates 12. The lower edge of bar 16 is therefore spaced above the lower edges of plates 12. Stop bolts 14 extend through a rear portion of the plates 12 immediately below the lower edge of bar 16 to limit downward rotation of the bar about pivot 17.

A portion of trip beam bar 16 is connected to a downwardly extending shank 20 by a pair of elbow plates 21. A plowshare 22 is connected to the lower end of shank 20 with the point of the plowshare substantially even with, or to the rear of, a vertical line extending through pivot 17.

A connecting arm 23 is rigidly secured to the forward end of trip beam bar 16, and extends upwardly therefrom. The extended end of connecting arm 23 is provided with an opening through which extends a pivot pin 24. When the plow is in the operative position, as shown in FIGURE 1, pivot pin 24 is approximately in vertical alignment with pivot 17.

A linkage generally indicated by reference numeral 30 is connected between the trip beam 15 and the supporting beam 10. Linkage 30 is connected to bar 11, which comprises the forward portion of supporting beam 10, by an adjustable bracket 31, the vertical parallel sides of which are pivoted by a pin 32 to bar 11 which is interposed therebetween. An upper cross bar 33 is secured between opposite sides of bracket 31 at a point above the upper edge of bar 11, and a set screw 34 which is threaded through the cross bar is adapted to engage the upper edge of bar 11. A lower cross bar 35 is secured between opposite sides of bracket 31 at a point below the lower edge of bar 11 and carries a set screw 36 adapted to engage the lower edge of bar 11. Engagement of set screws 34 and 36 with the upper and lower edges of bar 11 serves to lock the pivotally connected bracket 31 in a fixed position.

An anchor plate 40 is pivotally connected between the upwardly extended ends of the parallel sides of bracket 31 by a pivot pin 37. Anchor plate 40 is triangular in shape and the pivotal connection to bracket 31 is at one corner of the plate. A second corner of the triangular anchor plate 40 is interposed between two parallel members comprising a toggle link 41, and is pivotally connected at the forward end of link 41 by a pin 42. The opposite ends of the parallel members comprising toggle link 41 are pivoted to opposite sides of connecting arm 23 by the pin 24.

As shown in FIGURE 3, a reinforcing block 43 is affixed between the parallel members which comprise toggle link 41. A stop screw supporting block 44, as shown in FIGURES 1 and 2, is secured to the upper edge of supporting beam bar 11 at a point directly below toggle link 41. A stop screw 45 is threaded into the upper surface of block 44 and is adapted to engage reinforcing block 43 to limit downward movement of toggle link 41 and thereby prevent link 41 and anchor plate 40 from locking in a straight-line position. Reinforcing block 43 thus serves the dual functions of strengthening toggle link 41 and of engaging stop screw 45 to limit downward movement of link 41.

A U-shaped spring mounting bracket 50 has the downwardly extending legs thereof secured to opposite exterior surfaces of supporting beam plates 12, and extend upwardly therefrom. Each leg of bracket 50 has an outwardly extending transverse tab 51 of U-shaped cross-section through which an eyebolt 52 extends. The heads of eyebolts 52 project forwardly from bracket 50, and the opposite ends of the bolts are adapted to receive nuts 53 designed to limit forward movement of the bolts.

Each of a pair of tension springs 55 is connected between the anchor plate 40 and the head of each eyebolt 52 on opposite sides of the linkage 30. A spring anchor pin 56 is affixed through the third corner of the triangular anchor plate 40 and extends transversely from opposite sides thereof. The forward end of each of the springs 55 is hooked to the anchor pin 56 on opposite sides of anchor plate 40, and the springs are mounted with a predetermined tension while the plow is in the operative position shown in FIGURE 1. As will be explained, the amount of tension is adjusted by means of nuts 53 on the eyebolts 52.

The operation of the invention is as follows:

It will be apparent that the expansion springs 55, which are secured to the rear portion of the supporting beam 10 by brackets 50, act through rotatable anchor plate 40 and toggle link 41 to exert on the upwardly extending arm 23 of trip beam 15 a force which tends to rotate the trip beam in a counterclockwise direction about pivot 17. The degree of this rotation is limited by the stop bolts 14 which extend between the lower edges of the supporting beam plates 12 and engage the lower edge of trip beam bar 16 when it is in the operative position. When a force sufficient to overcome the opposing spring force is exerted on plowshare 22, the plowshare and trip beam 15 begin to rotate upwardly about pivot 17.

The invention provides certain adjustments which may be made to vary the forces necessary to initiate such rotation. Adjustability of both linkage alignment and spring tension is provided, and in neither case is the position of the plowshare with respect to the ground altered by adjustment. The linkage alignment is adjusted by rotation of the adjustment bracket 31, which is pivotally connected to the forward portion 11 of supporting beam 10. Rotation of bracket 31 about pivot 32 in a counterclockwise direction (as viewed in FIGURES 1 and 2) serves to decrease the angle between the lower edges of toggle link 41 and anchor plate 40, and rotation in a clockwise direction serves to increase this angle. The force of an obstruction, which tends to rotate trip beam 15 upwardly about pivot 17, is transmitted through toggle link 41 to rotate anchor plate 40 in a corresponding direction about pivot 37. The moment arm through which this force acts is represented by the perpendicular distance between pivot 37 and a line defined by the axes of the parallel members comprising link 41. When bracket 31 is rotated in a counterclockwise direction, this distance increases, thereby providing a greater moment arm about the pivot through which the force may act. When this moment arm is increased the force necessary to rotate anchor plate 40 about pivot 37 in opposition to the spring force is reduced, and a lesser force is necessary to initiate rotation to the tripped position. Conversely, when bracket 31 is rotated about pivot 32 in a clockwise direction away from pivot 24, the moment arm through which this force acts decreases, and a greater force is necessary to initiate rotation. Bracket 31 is set to the desired position by adjustment of the set screws 34 and 36 which engage the upper and lower edges of supporting beam bar 11. After anchor plate 40 and toggle link 41 have thus been adjusted to the desired positions, stop screw 45 is adjusted to engage the lower surface of the supporting block 43 interposed between the parallel members comprising toggle link 41 to limit downward movement of the link and prevent it from locking in a straight-line position with respect to plate 40. The set screws 34 and 36 and the stop screw 45 are all secured in their adjusted positions by suitable means, such as by lock nuts.

The spring force opposing rotation of trip beam 15 from the operative position to the raised position may be adjusted by increasing or decreasing the tension on springs 55 by adjusting nut 53 which is threaded on eyebolt 52. If the plow is to be used in relatively hard soil, the tension on springs 55 is increased so that the apparatus will not be tripped by the force of the soil alone but will require an overload such as that caused by striking an immovable obstruction.

When the plowshare 22 strikes an obstruction such as the rock shown in FIGURE 2 and the force exerted is sufficient to overcome the opposing spring force, the trip beam 15 and attached plowshare rotate upwardly about pivot 17 to the raised position where the plowshare easily passes over the obstruction. As connecting arm 23 rotates about pivot 17, the connected toggle link 41 rotates anchor plate 40 about pivot 37 in a corresponding direction. Initially, pivot 42, which connects toggle link 41 to anchor plate 40, is at a point to the rear side of pivot 37. As the trip beam is rotated upwardly and anchor plate 40 is rotated in a corresponding direction, pivot 42 moves upwardly through an arc to a point above pivot 37, and spring anchor pin 56 of anchor plate 40 moves from a point above pivot 37 to a point at the forward side thereof. Referring to FIGURES 1 and 2, it will be apparent that springs 55 tend to rotate anchor plate 40 in a counterclockwise direction about pivot 37 (as shown in FIGURES 1 and 2), and that upward rotation of trip beam 15 rotates anchor plate 40 in a clockwise direction. The moment arm about pivot 37 through which the spring force acts is represented by the perpendicular distance between the pivot and a plane defined by the axes of spring 55. The moment arm about pivot 37 through which the force of an obstruction acts is represented by the perpendicular distance between the pivot and a plane defined by the axes of the parallel members comprising toggle link 41. Referring to FIGURES 1 and 2, it will be seen that the moment arm about pivot 37 through which the obstruction force acts is at a minimum when the plow is in the operative position and at a maximum in the tripped position, and that the moment arm about pivot 37 through which the spring force acts is at a maximum in the operative position and at a minimum in the tripped position. When the plowshare strikes an obstruction and begins to rotate upwardly, the force necessary to maintain this rotation gradually diminishes as the raised position is approached. After the plowshare has passed over the obstruction and the spring force begins to rotate it back to the operative position, the force exerted on the trip beam gradually increases as the operative position is approached. The increase in the force acting to return the trip beam to the operative position is the result of two actions. First, the moment arm about pivot 37 through which the spring 55 acts increases from a minimum to a maximum as the operative position is approached. The return force is also increased by an increase in the moment arm about pivot 17, which is represented by a perpendicular distance between pivot 17 and a plane defined by the axes of the parallel members comprising link 41. As shown in FIGURE 2, this moment arm is at a minimum when the plow is in the tripped position, and as shown in FIGURE 1 it is at a maximum in the operative position.

The relatively rapid decrease in the force necessary to effect rotation of the trip beam as it moves from the operative position to the raised position is attributable to two factors in addition to the moment arm changes previously discussed. Referring to FIGURE 1, it will be apparent that movement of the forward end of each spring 55 initially is in a generally horizontal direction away from the opposite end of the spring, and that as anchor plate 40 continues to rotate, this horizontal component decreases and the vertical component increases. Thus, although springs 55 continue to expand during rotation of the trip beam from the operative position to the raised position, the rate of expansion decreases. A similar action occurs with respect to pivot 24 carried by the extended end of connecting arm 23. During the initial rotation of arm 23, the component of movement of pivot 24 toward anchor plate 40 is relatively large, but this component continues to decrease as pivot 24 rotates downwardly about pivot 17 during rotation of the trip beam to the raised position.

By way of example, springs 55 of a certain strength could be employed and bracket 31 and eyebolt nuts 53 could be adjusted so that a force of about 2450 pounds is necessary to initiate rotation of the trip beam 15 when it is in the operative position. This is sufficiently rigid to permit operation of the plow in even relatively hard soil. Thus the trip beam will remain in the operative position until the plowshare strikes an obstruction and the force acting upon the plowshare increases to about 2450 pounds. The trip beam 15 then begins to rotate upwardly about pivot 17. After it has rotated through 15 degrees, the force necessary to maintain upward rotation has decreased to about 1100 pounds. After the trip beam 15 has rotated through 45 degrees, the force necessary to maintain rotation as the plowshare passes over the obstruction has decreased to about 550 pounds, and this force continues to decrease to about 50 pounds after the trip beam has rotated through 60 degrees. After the plowshare has passed over the obstruction, the force tending to return it to the soil increases, for example, from about 50 pounds to about 2450 pounds to effectively drive the plowshare back into the soil.

As shown in FIGURE 1, none of the moving parts of the plow extend below the lower edge of the main supporting beam 10 when the plow is in the operative position. A small portion of the adjustment bracket 31 extends below the lower edge of supporting beam 10, but there is no movement of the bracket during operation of the plow. Since the moving parts are disposed above the lower edge of beam 10, they are relatively protected from dirt and field debris, which might otherwise cause interference with their proper operation, and which also would cause undue wear. As shown in FIGURE 2, all moving parts also remain above the lower edge of the main supporting beam 10 when the plow is in the tripped position, and there again is no danger of interference with their proper operation, or of possible contact with an obstruction.

Thus, it will be seen that the present invention provides an agricultural implement tripping mechanism which, although relatively simple in construction, embodies several important features. By means of the simple spring and linkage adjustments, the sensitivity of the tripping mechanism may be easily changed to conform to various soil conditions. Unlike many prior releasable plows, these adjustments in no way effect the position of the ground working tool with respect to the soil. The invention provides a relatively large initial resistance to rotation of the ground working tool from the operative position to the raised position, but this resistance rapidly decreases as the raised position is approached to permit the tool to easily pass over even a relatively large obstruction. After it has passed over the obstruction, the force applied to return it to the operative position rapidly increases as the operative position is approached to thereby effectively drive the tool back into the soil. In the normal or operative position, during rotation from the operative position to the raised position, and in the raised position, all moving parts of the present invention are disposed above the lower surface of the main supporting beam, where they are relatively protected from dirt and field debris. This construction insures proper operation and reduces wear.

While the invention is not limited to the use of particular spring values and sizes of the various elements, we have found it desirable in one particular embodiment to employ elements having the following dimensions and characteristics:

Toggle link 41—length of 22¼ inches
Distance between pivot points 17 and 24—6 inches
Distance between pivot points 37 and 42—6 inches
Distance between pivot points 32 and 37—3½ inches
Distance between pivot point 37 and anchor pin 56— 6¼ inches
Height of spring anchor bracket 51 above a horizontal line including pivot 32—5 inches
Distance from pivot point 17 to plow share point—28¾ inches The springs 55 in this embodiment were formed of 35 coils of ½ inch and had an outside diameter of 2⅝ inches. Starting with present tension of 300 pounds for a zero displacement of the spring, a total of 2,400 pounds was required to stretch each spring 7¾ inches, the total tension required to stretch the spring through various distances being as follows.

| Stretch in inches: | Total tension in pounds |
|---|---|
| 0 | 300 |
| 1 | 700 |
| 2 | 1,050 |
| 3 | 1,350 |
| 4 | 1,610 |
| 5 | 1,840 |
| 6 | 2,060 |
| 7 | 2,260 |
| 7¾ | 2,400 |

In general, it should be understood that the device herein described is intended only as an illustrative example of the present invention.

We claim as our invention:

1. A ground working implement comprising:

a supporting beam having a substantially horizontally disposed rear portion;

a trip beam adapted to carry a ground working tool and pivotally connected at a first point to said horizontally disposed rear portion of said supporting beam for rotation between an operative position and a raised position to permit said tool to pass over an obstruction;

an anchor plate pivotally connected to a forward portion of said supporting beam at a second point above the lower edge of said supporting beam;

a toggle link disposed above said supporting beam and pivotally connected to said trip beam at a third point above said first point and to said anchor plate at a fourth point between said second and third points and lying on a line extending through said third and fourth points which is displaced from said second point for movement above said supporting beam to rotate said anchor plate in the same angular direction as said trip beam is rotated between its operative and raised positions;

and tension spring means connected to said anchor plate at a fifth point above the lower edge of said supporting beam which is on the side of said line extending through said third and fourth points opposite said second point and to said supporting beam at a point to the rear of said fifth point and above the lower edge of said supporting beam to exert a force in opposition to rotation of said trip beam to said raised position and to return said trip beam to said operative position when said tool has passed over said obstruction, said second, fourth and fifth points forming a triangle with all of said points disposed as previously recited so that as said trip beam is moved to said raised position, the longitudinal axis of said spring means approaches said second point and said line extending through said third and fourth points moves away from said second point.

2. The ground working implement of claim 1 in which said trip beam has a substantially horizontally disposed portion extending rearwardly from said first pivot point and a downwardly extending portion at the rear end of said horizontally disposed portion and adapted to carry said ground working tool.

3. The ground working implement of claim 1 in which said anchor plate, said toggle link, and said spring means all are disposed above the lower edge of said supporting beam and the lowest point of the forwardmost end of said trip beam is at a distance from said first pivot point which is less than the distance between the lower edge of said supporting beam and said pivotal connection.

4. The ground working implement of claim 1 in which said anchor plate is pivotally connected to an adjustable bracket which is pivotally connected to said supporting beam, the position of said bracket being adjustable by means of a set screw engaging said supporting beam to provide adjustment of the angle between said anchor plate and said toggle link without altering the position of said trip beam and said ground working tool.

5. The ground working implement of claim 1 in which said spring means is adjustably connected to said supporting beam to provide adjustment of the force exerted by said spring means on said trip beam.

6. The ground working implement of claim 1 in which stop means is secured to said supporting beam between said anchor plate and said first point to limit downward movement of said toggle link.

7. The ground working implement of claim 2 in which stop means is carried by said supporting beam beneath said horizontally disposed portion of said trip beam at a point to the rear of said first point to limit downward rotation of said trip beam about said pivotal connection.

8. The ground working implement of claim 1 in which a plowshare is secured to said trip beam.

9. The ground working implement of claim 6 in which said stop means is adjustable to limit the initial displacement of said line through said third and fourth points from said second point.

References Cited

UNITED STATES PATENTS

| | | | |
|---|---|---|---|
| 1,068,832 | 7/1913 | Alsup | 172—266 |
| 1,319,489 | 10/1919 | Robinson | 172—268 |
| 1,713,212 | 5/1929 | Bickley | 172—268 |

ROBERT E. PULFREY, Primary Examiner

WALTER J. CONLIN, Assistant Examiner

U.S. Cl. X.R.

172—266, 268, 739, 744